US010040154B2

(12) United States Patent
Minotti et al.

(10) Patent No.: US 10,040,154 B2
(45) Date of Patent: Aug. 7, 2018

(54) HANDLING DEVICE FOR WIRE ELECTRIC DISCHARGE MACHINES

(71) Applicant: Agie Charmilles SA, Losone (CH)

(72) Inventors: Jean Pierre Minotti, Gorduno (CH); Giona Galizia, Losone (CH)

(73) Assignee: AGIE CHARMILLES SA, Losone (CH)

(*) Notice: Subject to any disclaimer, the term of this patent is extended or adjusted under 35 U.S.C. 154(b) by 290 days.

(21) Appl. No.: 14/833,190

(22) Filed: Aug. 24, 2015

(65) Prior Publication Data
US 2016/0059369 A1 Mar. 3, 2016

(30) Foreign Application Priority Data

Aug. 29, 2014 (EP) .................................. 14182753

(51) Int. Cl.
B23H 7/10 (2006.01)
B23Q 7/04 (2006.01)
(Continued)

(52) U.S. Cl.
CPC .............. *B23Q 7/043* (2013.01); *B23H 7/02* (2013.01); *B23H 9/12* (2013.01); *B23H 11/00* (2013.01); *B23Q 7/006* (2013.01)

(58) Field of Classification Search
CPC . B23H 7/02; B23H 9/12; B23H 11/00; B23Q 7/006; B23Q 7/043
See application file for complete search history.

(56) References Cited

U.S. PATENT DOCUMENTS 4,752,665 A    6/1988  Del Santo
4,767,905 A *  8/1988  Inoue ...................... B23H 7/04
                                                   219/69.13
(Continued)

FOREIGN PATENT DOCUMENTS

EP    0194353 A1    9/1986
EP    0480369 A2    4/1992
(Continued)

OTHER PUBLICATIONS

Machine translation of Japan Patent document No. 3-79,225, dated Aug. 2017.*
(Continued)

*Primary Examiner* — Geoffrey S Evans
(74) *Attorney, Agent, or Firm* — Leydig, Voit & Mayer, Ltd.

(57) ABSTRACT

A wire electric discharge machine for machining a workpiece includes a handling device for handling core pieces produced by the machine during the machining of the workpiece and upper and lower wire guiding heads moveable with respect to each other and with respect to the workpiece. The handling device includes a gripper mounted in a fixed or movable relation to the upper wire guiding head. The gripper moves so as to face a produced core piece with its gripper base. The gripper includes a fluid inlet where fluid flow under positive pressure enters the gripper and a fluid outlet at the gripper base where the fluid flow exits the gripper. An interior of the gripper guides the fluid flow, producing a low pressure region at the gripper base as the fluid flow exits, generating lifting force to remove the produced core piece from the workpiece by movement of the gripper.

19 Claims, 8 Drawing Sheets

(51) Int. Cl.
  *B23H 7/02* (2006.01)
  *B23H 9/12* (2006.01)
  *B23H 11/00* (2006.01)
  *B23Q 7/00* (2006.01)

(56) References Cited

U.S. PATENT DOCUMENTS

| | | | | |
|---|---|---|---|---|
| 4,843,203 A * | 6/1989 | Gamo | ............... | B23H 7/065 |
| | | | | 219/69.12 |
| 5,015,814 A * | 5/1991 | Morishita | ............... | B23H 11/00 |
| | | | | 219/69.12 |
| 5,164,563 A | 11/1992 | Aso et al. | | |
| 5,365,030 A * | 11/1994 | Hayakawa | ............... | B23H 7/10 |
| | | | | 219/69.12 |
| 5,386,093 A | 1/1995 | Borsari | | |
| 6,427,991 B1 * | 8/2002 | Kao | ............... | B23Q 1/38 |
| | | | | 269/21 |
| 6,467,297 B1 * | 10/2002 | Bollinger | ............... | H01L 21/223 |
| | | | | 156/345.1 |
| 6,884,957 B2 * | 4/2005 | Kita | ............... | B23H 11/003 |
| | | | | 219/69.12 |
| 2003/0052495 A1 * | 3/2003 | Casarotti | ............... | H01L 21/67259 |
| | | | | 294/188 |
| 2003/0178146 A1 * | 9/2003 | Kao | ............... | H01L 21/6838 |
| | | | | 156/345.51 |
| 2008/0257867 A1 * | 10/2008 | Malshe | ............... | B81C 1/00492 |
| | | | | 219/69.14 |
| 2010/0052345 A1 * | 3/2010 | Chang | ............... | B25J 15/0616 |
| | | | | 294/64.3 |

FOREIGN PATENT DOCUMENTS

| | | | |
|---|---|---|---|
| EP | 512314 | A2 | 11/1992 |
| FR | 2174673 | A2 | 10/1973 |
| GB | 748138 | A | 4/1956 |
| JP | S 57201127 | A | 12/1982 |
| JP | S 60180726 | A | 9/1985 |
| JP | S 63185531 | A | 8/1988 |
| JP | H 02131816 | A | 5/1990 |
| JP | 3-79225 | A * | 4/1991 |
| JP | H 0379225 | A | 4/1991 |
| JP | H 03213214 | A | 9/1991 |
| JP | H 03256616 | A | 11/1991 |
| JP | H 03256617 | A | 11/1991 |
| JP | H 03270822 | A | 12/1991 |
| JP | H 03294118 | A | 12/1991 |
| JP | H 0463629 | A | 2/1992 |
| JP | H 04310316 | A | 11/1992 |
| JP | H 05269625 | A | 10/1993 |
| JP | H 08001439 | A | 1/1996 |
| JP | 2000-263545 | A * | 9/2000 |
| JP | 2002001618 | A | 1/2002 |
| JP | 2012-166289 | A * | 9/2012 |
| WO | WO 9745862 | A1 | 12/1997 |

OTHER PUBLICATIONS

Machine translation of Japan Patent document No. 2012-166,289, dated Feb. 2018.*

* cited by examiner

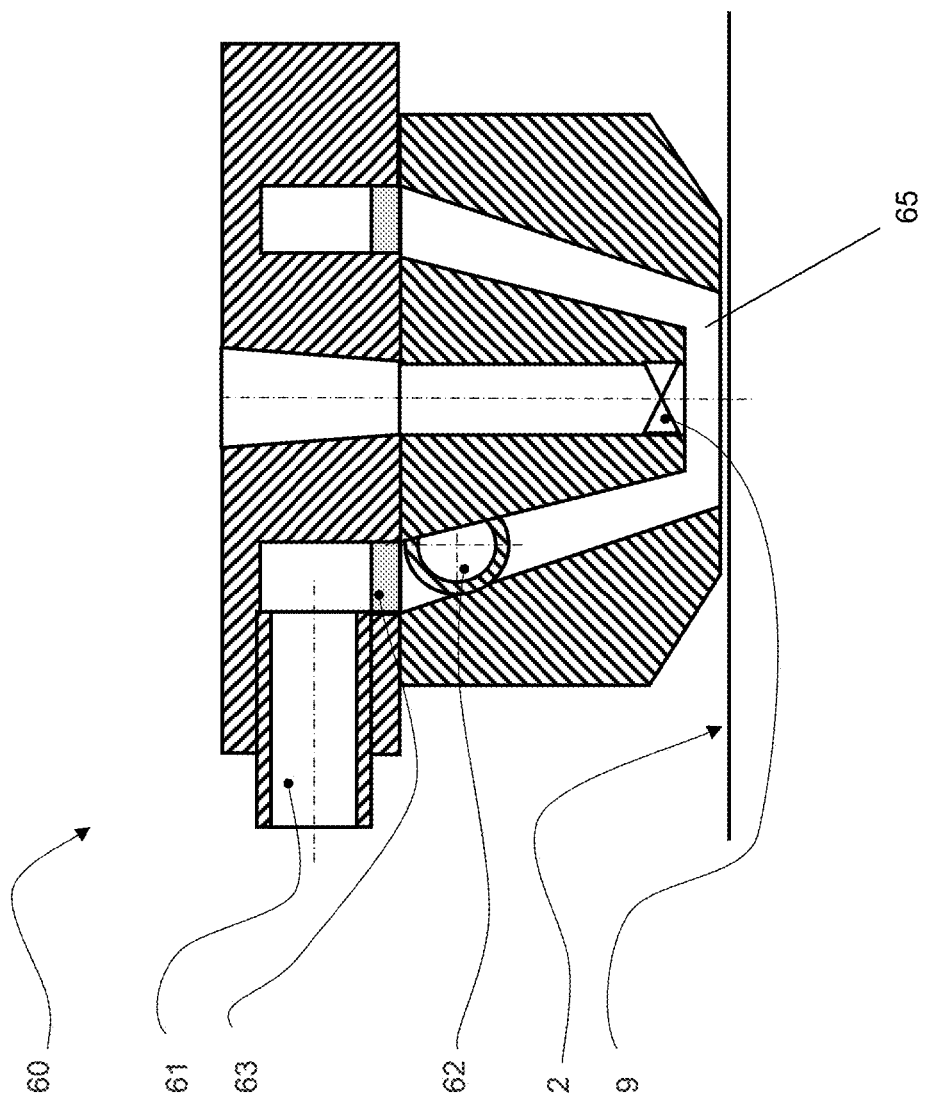

HANDLING DEVICE FOR WIRE ELECTRIC DISCHARGE MACHINES

CROSS-REFERENCE TO PRIOR APPLICATION

Priority is claimed to European Patent Application No. 14 182 753.5, filed on Aug. 29, 2014, the entire disclosure of which is hereby incorporated by reference herein.

FIELD

The present invention refers to a device for the handling of parts in a wire electric discharge machine, in particular the removal of a core piece from a work piece.

BACKGROUND

One of the main applications of Wire Electric Discharge Machines (WEDM), representing a major part of the entire WEDM application range is the production of punches and dies for stamping tools, whereas punch and die have essentially same geometry, but slightly different size. By cutting a closed contour in a work piece, for instance a die, a core part remains. When a die is cut, the produced core piece (so called dropout part, slug, cutout) is not used and has to be removed because it is an obstacle for the further processing of the die. Similarly, if the core piece is the desired part to be manufactured, it has to be extracted carefully and safely stored for further processing.

Traditionally the main cut of a contour is cut leaving a small connection joint, so that the core part remains suspended in the work piece. The machine stops, and the operators fixes the core part by means of magnets or by gluing or by otherwise holding in place the core part. Then the operator restarts the control program and the machine cuts the small connection joint. The machine stops again, and the operators removes the one or more core parts. Finally he restarts the control program and the machine completes the dies by executing one or more trim cuts.

One may decide to simply let the dropout part fall into the work tank or into a collection basket by gravity, which however is risky. In fact a small core part may slide down into the nozzle or adhere to the work piece and thus cause an uncertain condition, with an increased risk of collision and possible damage of the work piece and the lower nozzle or other machine parts. On the other hand, a large dropout part or a plurality of slugs at the bottom of the work tank may be of hindrance, and there is an increased risk of collision with the lower arm. To reduce the risk a larger dropout part may be cut in smaller sections.

If the size of the core part is small, a dropout part can be avoided by a so-called no-core cut (also full-removal cut or pocketing), by which the entire core part is completely eroded. This technique can also be used to eliminate protruding sections of a dropout part, which may be of hindrance to extract the dropout part. The pocketing technique has the advantage that no additional handling devices are required, and there remains no waste piece to be handled. However it is time consuming, and generally it is only reasonable with comparably small slug volumes. The control may thus be instructed to adopt the full-removal cut strategy based on the volume of the dropout part and the expected machining time for the full-removal cut.

Among the WEDM in the field many are integrated in a communication network by which they can be monitored and controlled remotely, and some comprise pallet changers with identification chips, extra-large wire spool sizes or double wire circuit, central filter station for the conditioning of the dielectric etc., by which the autonomous, unattended operation can be substantially extended. However, still today most of the machines have no automatic means for the removal of the dropout part in WEDM, which are thus mainly removed manually after the main cut or are simply made to drop in the work tank. To slightly relieve this situation, some control devices comprise so called "early-late" strategies (EP 512 314), by which the operator can organize the machining sequence of one or more pieces to be cut in function of his presence at the machine. The operator can select the time for actual intervention in the generally lengthy operating process by organizing the sequence of the main cut (full cut), the separation cut and the trim cuts. He can adapt the time for this intervention according to his labor time or more generally, according his availability. These strategies are advantageous, since the entire processing time in WEDM is very long compared with the time needed for the separation cut and for the manual intervention, and because essentially no additional hardware is required.

Beside the above mentioned measures which increase the availability of the machine and user-friendliness by simple improvement of the control, a number of devices for the automatic removal of the dropout part have been proposed in patent literature, but only few have been implemented in practice.

As an example, in the late eighties an attempt has been made with the mechanical dropout part remover Agiepick. This device was able to remove a dropout piece having a size of 10 mm up to about 50 mm square. The core part to be removed was grasped by means of a moveable arm having an expandable pin. The core part comprises an appropriate hole of 3 mm diameter in which the expandable pin was inserted after the completion of the separation cut. Then the expandable pin was expanded and the core part was lifted by means of a vertical lifting movement and then moved laterally by a rotational movement. Here the expandable pin was loosened so that the core part dropped in a receptacle. A detection plate was incorporated to provide a control signal. The hole was either the start hole or an additional hole made for the particular purpose of core part removal. The mechanical picking device was coupled with the hole of the dropout piece by force closure. The expandable pin was inserted in the comparably small hole, and needed to be centered accurately. Thus the expandable pin was subject to wear and deterioration; erroneous positioning and manipulation errors lead inevitably to malfunctioning and failure of the dropout part remover, so that the primary scope was not achieved reliably.

Another solution has been proposed with the Eject 1000, in which the control program generates a connection joint formed as a triangular nose. After the main cut the slug is separated and ejected by a hammer-like mechanism.

As a further example, a collecting basket mounted with the lower wire guiding arm has been realized. This solution is comparably simple but fits only for certain applications, with comparably small parts, and limits the axis stroke due to the encumbrance of the collecting basket.

Other mechanical solutions have been described in the patent literature, f.i. in JP2002-001618A, in which a pin array actuated from the lower side of the work piece presses against the lower surface to lift the core, which is then grasped by a gripper. In general mechanical dropout part removers are all somehow critical from the reliability point of view. Thus other principles have been considered to hold the slug:

Electromagnetic devices such as the ones described f.i. in JP05-269625A, JP04-310316A, JP04-063629A, JP03-294118A, JP02-131816A, JP63-185531A, EP194353A1 are easily controllable, but have the disadvantage that they can be used only with ferromagnetic work pieces. JP03-256617A is a combination of an electromagnetic device and a suction pad.

Suction devices such as the ones described f.i. in JP03-256616A, JP03-213214A, JP03-079225A, EP194353A1, JP60-180726A are of comparably simple constitution, and negative pressure is generally available on a WEDM, and works with all materials and most surfaces, but have some disadvantages which will be discussed later on.

Sometimes the slug removing devices are supported by fluid pressure jet acting on the lower surface of the slug, as shown in JP08-001439A, JP03-294118A, JP03-270822A.

As known the size of slugs and their geometries, as well as the range of materials to be processed by WEDM is wide. The known devices are not satisfying. Each has one or more drawbacks, but the most important aspect is their unreliability and low applicability to machine environment.

The scope of the present invention is thus to provide a simple device for the reliable automatic removal of core pieces. The foregoing and other objects and advantages will become apparent from the detailed description of the invention and the accompanying drawings.

SUMMARY

A wire electric discharge machine for machining a workpiece includes a handling device for handling core pieces produced by the wire electric discharge machine during the machining process of the workpiece and an upper wire guiding head and a lower wire guiding head that are moveable with respect to each other and with respect to the workpiece. The handling device includes a gripper mounted in a fixed or movable relation to the upper wire guiding head. The gripper can be moved so as to face a produced core piece with its gripper base. The gripper includes a fluid inlet that permits a fluid flow under positive pressure to enter the gripper and a fluid outlet at the gripper base that permits the fluid flow under positive pressure to exit the gripper. An interior of the gripper guides the fluid flow to produce a low pressure region at the gripper base as the fluid flow exits the gripper at the fluid outlet so as to generate a lifting force on the produced core piece to remove the produced core piece from the workpiece by movement of the gripper.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 7 and 8 are sectional views of an upper wire guiding head with integrated gripper.

DETAILED DESCRIPTION

Figure 1:
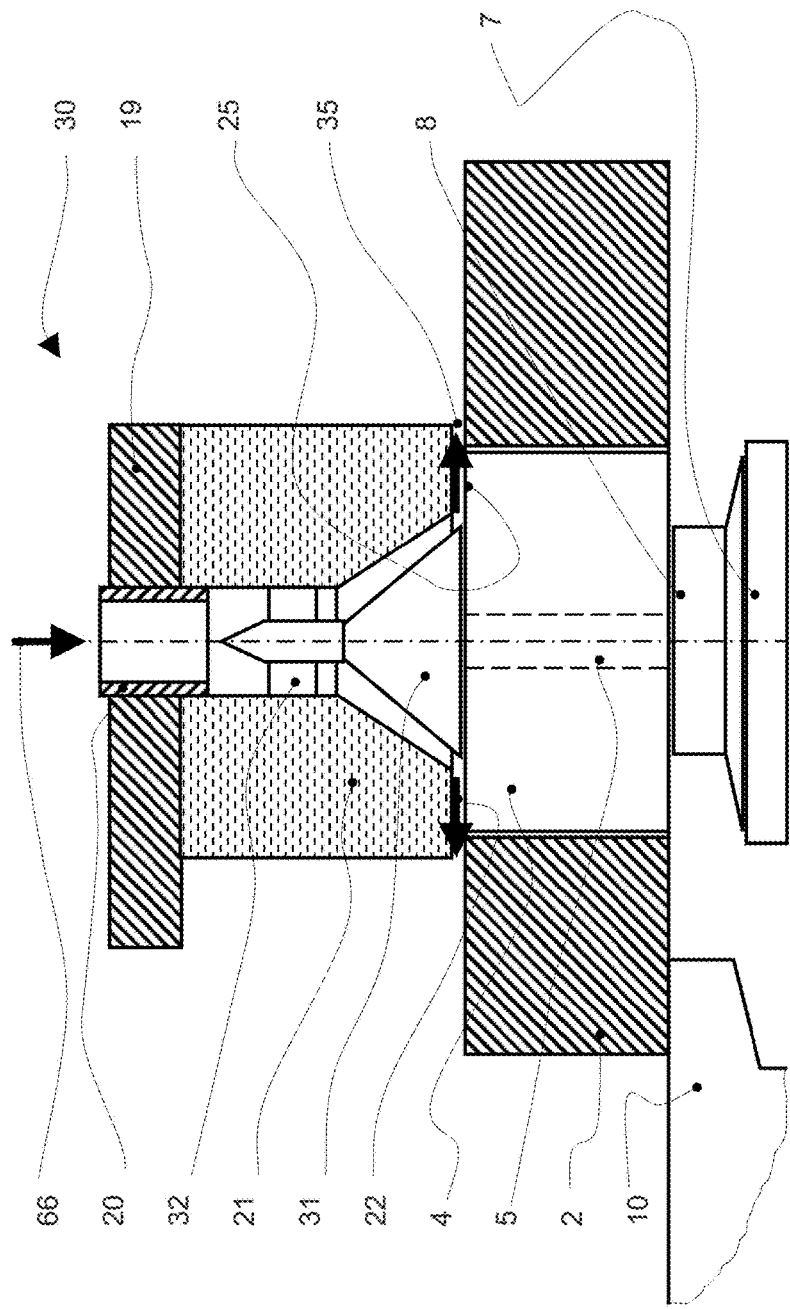
FIG. 1 is a side sectional view of a Bernoulli gripper in a working position over a core piece.
Figure 2:
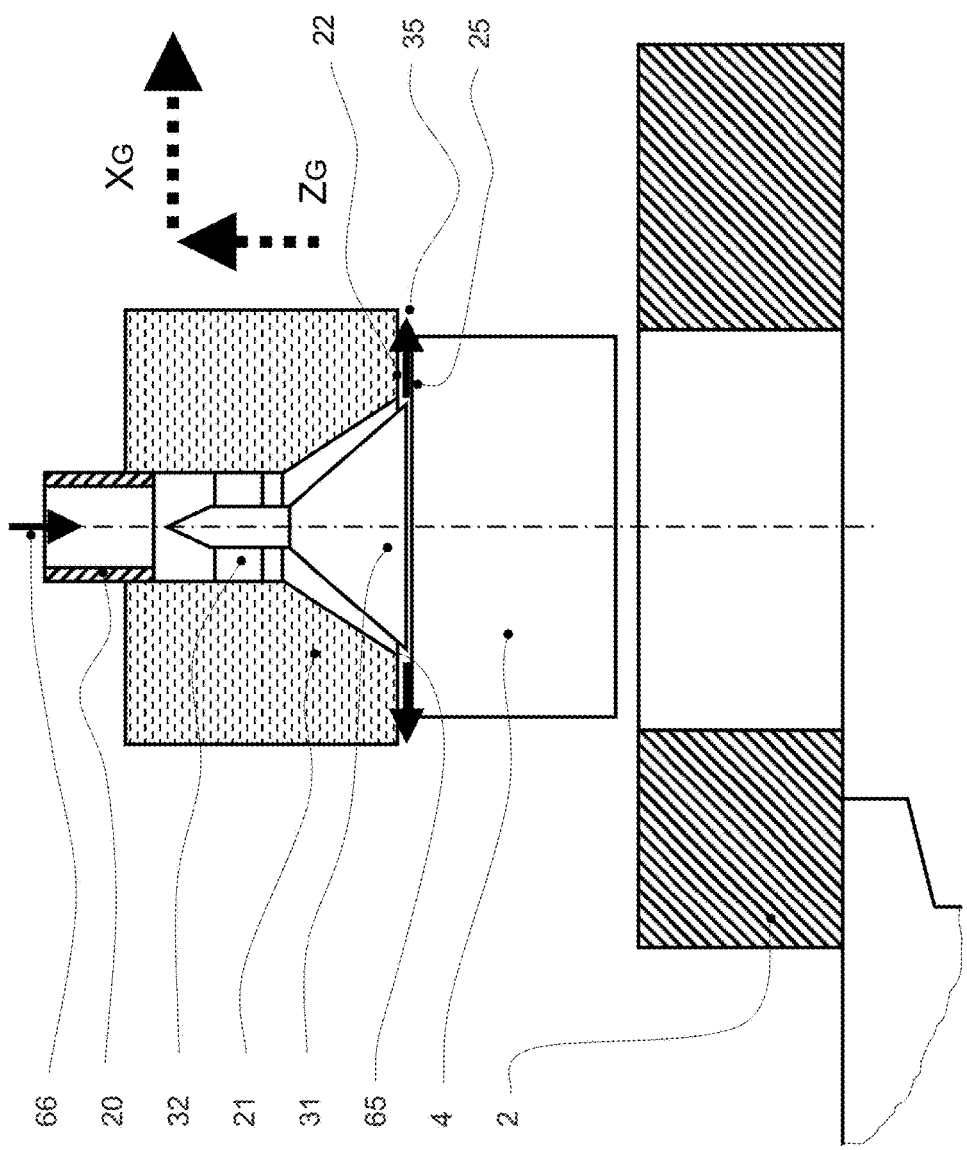
FIG. 2 is the gripper of FIG. 1 during a lifting movement.
Figure 3:
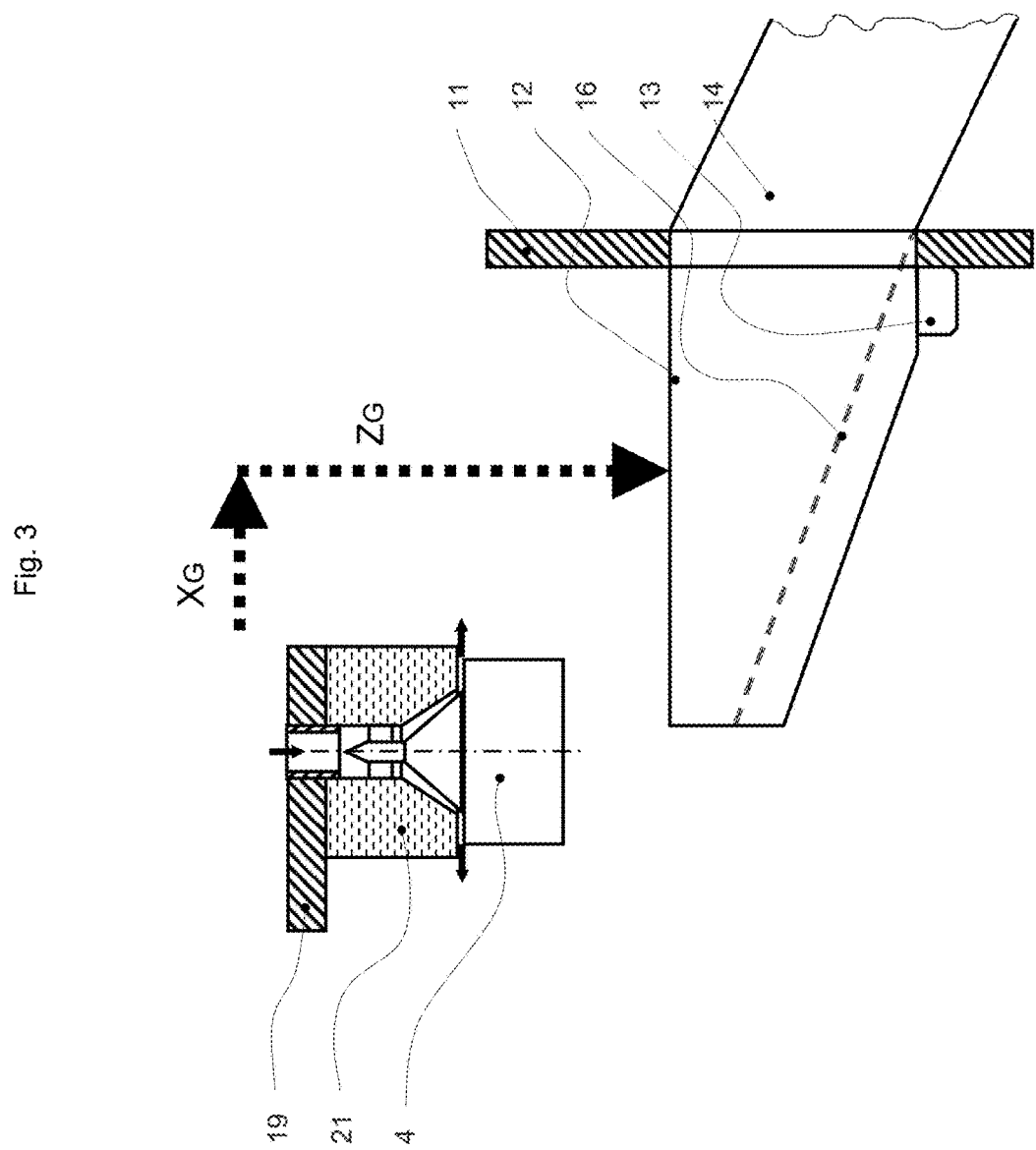
FIG. 3 is the gripper of FIGS. 1 and 2 during an evacuation movement.

As mentioned above in relation with prior art, it is known to use a gripper with a common suction respectively vacuum cup in a WEDM dropout part handling device. These known devices use a negative pressure to generate a lifting force to a dropout part. The traditional suction cup (or vacuum cup) is coupled with a remote negative pressure source. The low pressure in the interface area between the suction cup and the dropout part generates the lifting force. The efficiency of the vacuum cup depends of the quality of contact with the surface of the object to be lifted; surface roughness, stepped parts, holes and unevenness reduces the efficiency of the vacuum cup. The vacuum cup is generally made of rubber or other soft material, to better match with the contact area. With each lifting and loosening cycle the vacuum cup comes into contact with the object, and frictions against a surface which may be dirty and may comprise sharp edges. Also the vacuum cup and the entire aspiration up to the remote source of negative pressure are subject to encrustation by the erosion particles and deterioration. Progressive deterioration leads inevitably to leakage and finally to failure of the vacuum cup. Lastly, a partially deteriorated and encrusted vacuum cup may leave undesired impressions on the surface of the work piece.

In general, in case of a die produced by a WEDM there is a start hole somewhere, in which the wire is thread and from which the die is cut. Said start hole represents a bypass to the formation of negative pressure region in a dropout piece. In particular, if an aspiration section of the suction cup is aligned with said start hole the possible lifting force may be much less than expected.

These problems can be substantially reduced by using a positive pressure operated gripper, as suggested by the invention. In the present invention the term "positive pressure fluid flow" gripper is used to specify that the supplied fluid is under positive pressure; the flow direction is towards the gripper. However this positive pressure is routed such as to generate a low pressure. Various such positive pressure grippers are known, in particular radially diverging flow gripper, such as the Bernoulli gripper or a whirling flow gripper, such as the "Vortex" gripper or the "Cyclone" gripper. These grippers are now described in more detail.

An early design of the so called Bernoulli gripper is described in GB748138A, by Blaber, filed 14. Apr. 1953, following the principles described by Daniel Bernoulli. The Bernoulli gripper is characterized by the fact that a positive pressure fluid flow is redirected from the axial to a radial direction, so as to obtain an uniform outwards oriented high speed fluid flow at the active surface of the gripper. According to Bernoulli's equation, the increased velocity flow generates a decreased local pressure. By bringing the gripper in the vicinity of the object to be manipulated a narrow channel is formed in the interfacing area in which a high velocity radially diverging fluid flow is formed. Since the diverging flow is essentially circular, the interface area between gripper and object to be manipulated is subject to low pressure, enabling said objects to be attracted.

The redirecting of the fluid flow is done by properly shaping the fluid channel, for instance by a simple deflector at the end of the axial flow or by a fluid-dynamically optimized deflector with a nearly radially oriented circular slit-shaped nozzle in the generally circular gripper base.

The injected fluid flow escapes in the ambient through the narrow gap between the gripper and the object to be manipulated, but also causes a repulsive force on said object. In a certain gap distance range the attracting force is higher than the rejecting force, so that an object up to a certain weight can be lifted. It is known that the net lifting force has a maximum at a certain distance from the gripper base (Dini et al., 2009, "Grasping leather plies by Bernoulli grippers", CIRP Annals—Manufacturing Technology 58, pp. 21-24, FIG. 5). With an optimal fluid gap formed at the gripper base a weight nearly corresponding to the maximum lifting force can be lifted. With rigid objects to be manipulated there remains a small gap between the gripper and the object, which makes these grippers virtually non-contacting.

Although the gap is intrinsically self-regulated, Bernoulli grippers generally comprise one or more protruding mechanical spacers, f.i. friction pads or rings, typically 3 or 4 at the periphery of the interfacing area, or a central raised portion by which the object is contacted and the size of the gap is set. The pads provide stability, so that lateral sliding and vibration of the object are suppressed.

Bernoulli grippers are available in different dimensions and geometries. For instance at Vuototecnica S.r.l, Beverate di Brivio, Italy, supplies several sizes ranging from a diameter of 20 mm to 60 mm (models BEC20 to BEC60). Similar sizes are available at Bosch-Rexroth A G, Lohr am Main, Germany, with the so called Non-Contact Transfer Series (NCT). Festo A G, Esslingen am Neckar, Germany, offers the OGGB gripper series with diameters ranging from 60 mm to 140 mm (models OGGB-60 to OGGB-140). SMC Corporation, Tokyo, Japan offers a variety of grippers based on the Bernoulli principle, with diameters ranging from 20 mm to 100 mm, and a corresponding lifting force from 4.3N to 44N. All these grippers are operated with compressed air or a compressed inert gas.

Another positive pressure fluid flow operated gripper, the swirling flow type gripper, is described for instance in FR2174673A2. A pressurized air source is connected to a cylindrical chamber, and said first chamber is connected to a trumpet shaped coaxial section and further to a mouthpiece. In the proximity of the mouthpiece there is a cone shaped deflector and a plurality of fins by which a high speed swirl flow is generated. When the gripper is positioned in vicinity to an object the high speed swirling flow generates a low pressure in the gap and impresses a lifting force on the object. Similar grippers are illustrated in US2003052495A1 and WO9745862A1.

So called cyclone type cups are available at SMC Corporation, Tokyo, Japan. The height of the special low profile models XT661-260 is less than 2 mm, and the sizes range from 20 to 25 mm.

Non-contact grippers are commonly used for the manipulation of thin lightweight objects, essentially two-dimensional objects, fragile and/or delicate objects, in particular in the semiconductor (wafer) and electronics industry, CD's, DVD's, optical parts, food and pharmaceutical industry and other pick and place applications, in general packaging, but also with non-rigid objects such as fabric, etc. . . . . The use is generally limited to a mass production environment, mostly for comparably high manipulation speed. Due to the nature of the objects to be manipulated the low pressure and thus the lifting force is sometimes limited. Also it is to be noted that generally only perfectly clean dry air or gas can be used for the mentioned applications, because no emissions are tolerated.

To the knowledge of the inventors, this type of gripper has never been used in a machine tool environment. This is mainly due to the fact, that known applications request a clean a dry environment which is substantially different from the environment of EDM machining: The objects to be gripped are immerged or are at least wet by the machining fluid and soiled by debris which are produced during the machining process. Even though in WEDM there is no need for rapid movements, the objects to be manipulated are very different in geometry and sometimes comparably heavy, and often comprise a hole and apertures which make the grabbing difficult. Tests have now surprisingly shown that this grabbing principle can also be applied in the field of EDM machining.

The present invention discloses a positive pressure fluid flow gripper which is adapted to be used for the automatic handling of core pieces in a wire electric discharge machine. First, a possible sequence of operation for the case of a die to be cut, with a dropout piece to be removed from the work piece will now be explained with reference to the FIGS. 1-3 and 6, which shall illustrate one of many possible implementations of the device according to this invention.

The WEDM operation is normally started by treading the wire electrode 3 in a start hole 5 in the work piece 2; in case of a die the start hole 5 is inside the contour to be cut. The main cut is executed according to the programmed geometry and process technology. The contour is cut entirely, leaving no separation cut, so that the core piece 4 is completely free. The lower wire guiding head 7 supports the core piece 4. For instance, the flushing nozzle of the lower wire guiding head 7 may comprise a flat support plate 8, adjacent to the lower surface of the work piece 2, so that the free core piece 4 is supported and remains in place horizontally after completion of the main cut. Then, the wire 3 is cut, and the upper wire guiding head 6 is retracted by a certain amount from the work piece surface by means of the Z-axis 17. Let us now assume that the start hole 5 is in the center of the core piece 4: in this case the main axes X/Y and UN are moved so as to align the axis of the automatic handling device 18 with the start hole 5 in the core piece 4 (which in this case is a dropout piece) at the upper side of the work piece 2, and to align the lower wire guiding head 7 with the start hole 5 of the dropout piece 4 at the lower side of the work piece 2. In this way the core piece 4 is best supported by the support plate 8 on lower wire guiding head 7, and the gripper is suitably placed to achieve a possibly large interference area with the core piece 4 for effective grasping.

The automatic core piece handling device 18 comprises a piston by which the gripper is moved vertically to the desired position, at same or lower height than the flushing nozzle of the upper wire guiding head 6. Then the Z-axis 17 is lowered by the amount necessary to bring the gripper base 22 in close vicinity to the dropout piece 4. The positive pressure fluid is fed to the fluid inlet 20 of the gripper, by which the dropout piece 4 is attracted. The Z-axis 17 is lifted to the maximum height, the X/Y axes are moved so as to place the automatic core piece handling device 18 above of a receptacle 12 at the side of the work tank 11, the Z-axis 17 is lowered and the positive pressure fluid is released, so that the dropout piece 4 drops in the receptacle 12. The receptacle 12 is connected with a chute 14 i.e. a sloped duct, by which the dropout piece 4 slides into a collecting tray 15 of adequate capacity. Alternatively the chute may bring the dropout pieces 4 to an existing container for the used wire.

The automatic core piece handling device 18, which is mounted on the Z-axis 17 of the WEDM 1, comprises a pneumatic piston with a gripper support 19, which is able to bear different types and sizes of inventive grippers 30. The gripper 30 is moved to a grabbing position and back, to a retracted position. During normal WEDM operation the piston is retracted, whereas it is extended for gripping. If needed the piston may also be retracted during the evacuation of a dropout piece, i.e. to lift the dropout piece 4 into the receptacle 12. Of course any other suitable actuation means can be used. The gripper 30 may be hinged with the gripper support 19, so that the gripper base 22 is aligned with the dropout part, also in case of small misalignment.

The receptacle 12 may be divided in sections, for instance with a section for dropout parts (slugs) and another section for punches. The receptacle is placed in the upper region of a sidewall or rear wall of the work tank 11, and may be mounted inside or externally. In case of external mount the automatic core piece handling device 18 is adapted to lift the core piece 4 over the wall of the work tank. The receptacle 12 further comprises a grid 16 and a drain 13 to re-feed the liquid in the work tank, f.i. in cases the machining liquid (deionized water) is used as positive pressure fluid to supply the gripper 30.

Based on information about the current work, which is generally available with each WEDM operation, the control system of the machine may autonomously decide if a core piece can be safely removed from the work piece or not, and to flag each core piece accordingly. The work sequence is organized with the known "early-late" strategies, whereas the core parts flagged as "safely removable (by means of the automatic handling device)" are integrated in the operations which do not require the presence of the operator. The information about the current work may comprise the type of material to be machined and the machining geometry and the height of the work piece, so that the control can easily compute the volume, the mass, respectively weight of a core piece. Also, based on the upper contour of the core piece the interference area between gripper base 22 and core piece 4 surface can be estimated, and a gripping loss factor ($\leq 1$) can be computed to correct the max admissible weight of the core piece. Further, based on the known height of the work piece the control can check if the core piece can be safely evacuated in a collecting tray, without any collision.

As mentioned above the lifting force achieved with a conventional gripper may be much less than expected, in particular if a bypass for the fluid, such as a start hole 5 is present in the core piece 4, facing the gripper base 22. Such bypass may preclude the formation of a consistent low pressure region. Thus, according to a further embodiment of the invention the gripper base 22 may advantageously comprise a sealing element to at least partially reduce the pressure loss through an aperture through which the fluid can flow, that is, a hole in the core piece, or any wirecut section between the start hole and the contour. Said sealing element is preferably a flat pad made of plastic material, which is provided at the center of said gripper base, protruding from the gripper base 22 approximately by the amount at which the maximum net lifting force is achieved. Said sealing element is preferably mounted on a central part of the gripper, such as a deflector 31 of Bernoulli gripper 30, or a gripper core 41 of a Vortex gripper 40, or a gripper core 51 of a cyclone gripper 50. The sealing element can be combined with the spacer 42, which is used to set a well-defined gap distance.

Figure 4:
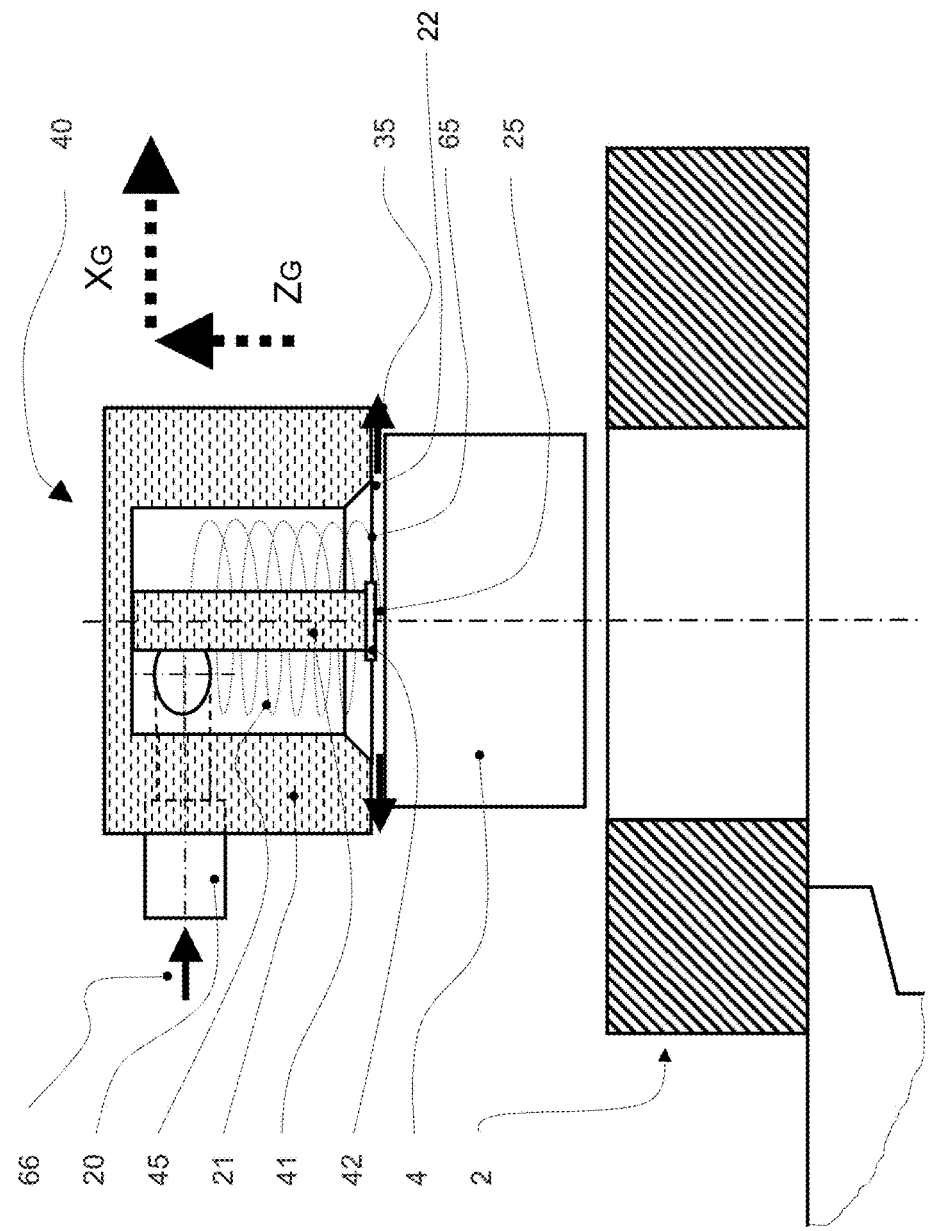
FIG. 4 is a sectional view of a Vortex gripper during a lifting movement.
Figure 5:
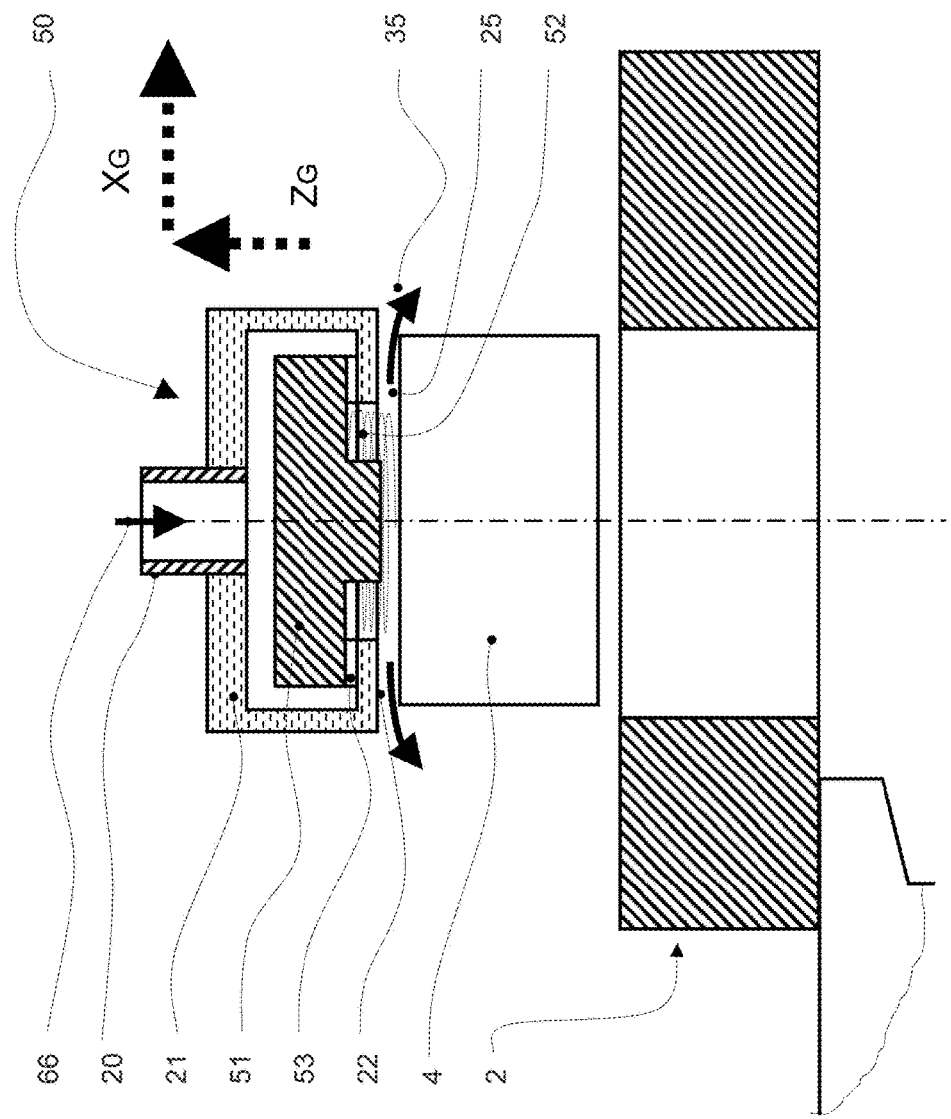
FIG. 5 is a sectional view of a Cyclone gripper during a lifting movement.
Figure 6:
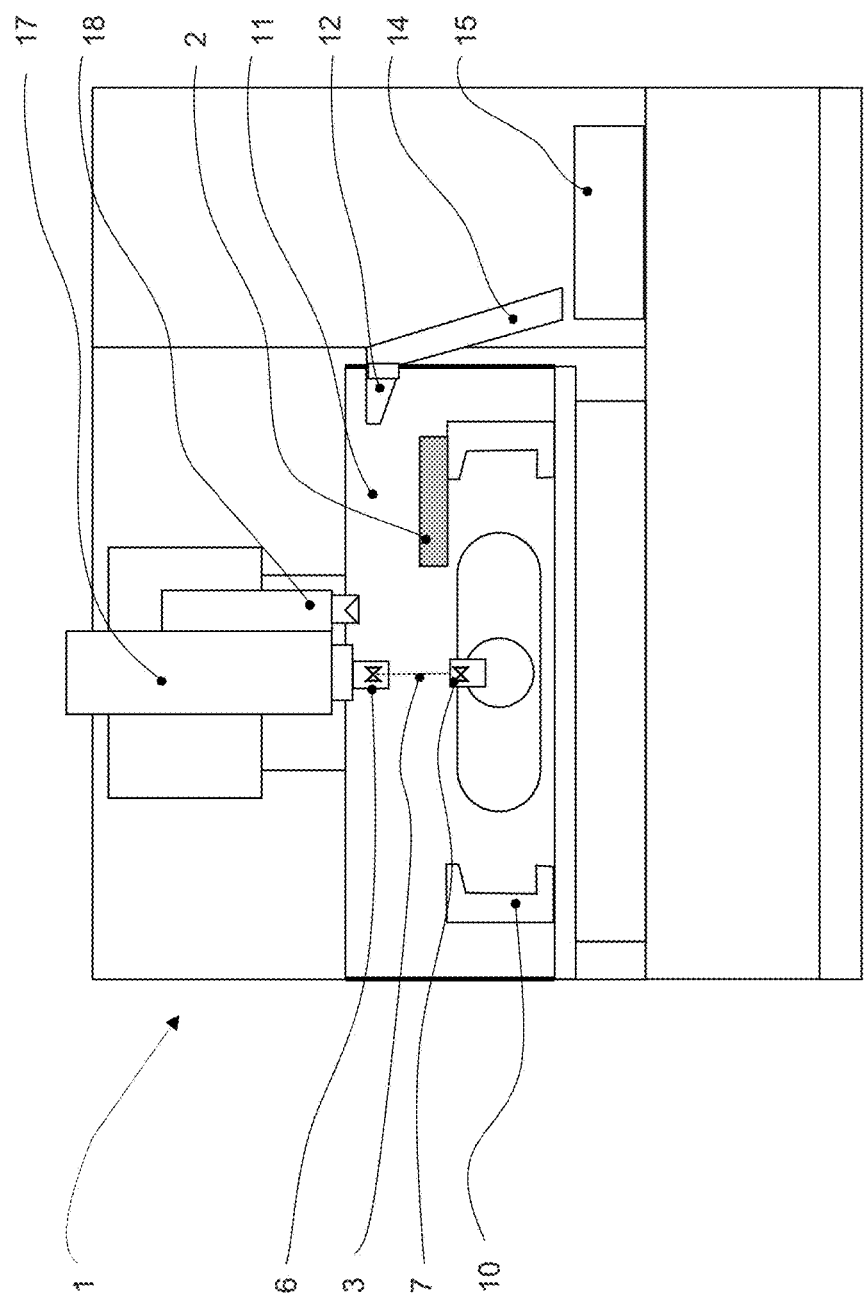
FIG. 6 is a front plane view of a WEDM with a core piece evacuation solution.

FIG. 4 showing a Vortex gripper and FIG. 5 showing a Cyclone gripper are to illustrate variants which are also based on the positive pressure fluid flow gripping principle. As with the Bernoulli gripper 30—illustrated in FIGS. 1 and 2—a high speed fluid flow is generated at the gripper base. A low pressure region 25 is formed between the gripper base 22 and the core piece 4. Both, the Vortex gripper 40 and the Cyclone gripper 50 comprise a section in which the incoming fluid flow is guided such as to whirl in the gripper body and in the gap.

The Vortex gripper 40 of FIG. 4 is now described in detail. The fluid inlet 20 of the Vortex gripper 40 is tangential to a cylindrical hollow section inside of the gripper body 21. Advantageously a gripper core 41 supporting a spacer 42 is mounted coaxial with the cylindrical hollow section inside of the gripper. A swirling fluid flow moves downwards in the gripper, so that, by the centrifugal force low pressure is generated in the central region of the hollow section of the gripper. Then, the fluid flows at high speed into the gap formed between the gripper base 22 and the dropout piece 4 producing also—in support of the low pressure region 25—low pressure in the gap too. Lastly the fluid escapes radially and tangentially in all directions in the ambient. Reference is made to Kagawa et al. "Analysis of vortex levitation", in: Experimental Thermal and Fluid Science, 32 (2008) pp. 1448-1454.

The Cyclone gripper 50 of FIG. 5 is now described in detail. The fluid inlet 20 of the Cyclone gripper 50 is co-axial and the pressurized fluid flows downwards, between a gripper body 21 and a gripper core 51. In the vicinity of the annular aperture 52 at the gripper base 22, the gripper body 21 and the gripper core 51 are linked by a plurality of skew guide fins 53. The fins are skewed so as to generate a swirling fluid flow in the annular aperture 52. As in the case of the Vortex gripper 40 the fluid escapes radially and tangentially in all directions through the gap at the bottom of the gripper respectively gripper base 22 and in the ambient.

The positive pressure fluid flow grippers are generally operated with compressed air, which is particularly suitable because it can be simply expelled in the ambient. In special cases inert gas can be used. According to a further preferred embodiment of the present invention, the positive pressure fluid flow fed to the gripper is a liquid. This is highly advantageous because the net lifting force generated by the positive pressure fluid flow gripper is proportional to the density of the supplied fluid. In a preferred embodiment, the fluid supplied to the positive pressure fluid flow gripper is the processing fluid used in WEDM processing, that is deionized water. This is possible in the particular environment of WEDM, because the object to be manipulated is not damaged nor otherwise affected by the processing liquid, and because the supplied fluid drops back into the work tank 11. Nonetheless, compressed air or other fluids or a mist can be used for the application of the invention.

In case of the formation of excessive water spray due to the positive supply pressure a circular curtain can be used to capture the spray. The circular curtain may be a textile or rubber curtain or a fluid curtain applied around the inventive gripper.

Figure 7:
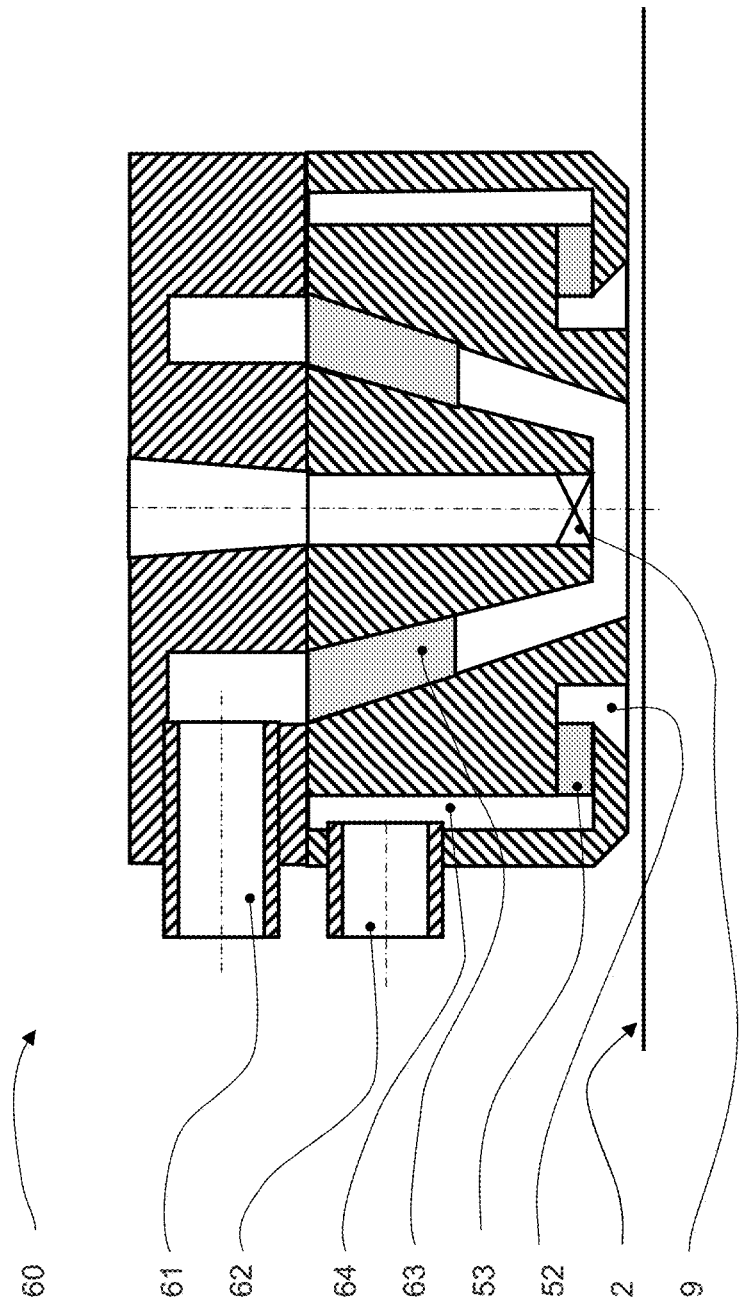

According to another preferred embodiment of the present invention, the upper and/or lower wire guiding head of the WEDM comprises one or more integrated grippers 60 (see FIGS. 7 and 8). In such an embodiment the upper wire guiding head comprises an integrated fluid supply circuit, by which the positive pressure fluid is routed such that a low pressure region 25 is generated between the integrated gripper and the core piece. The machine axes can be used for all manipulation displacements, so that there is no need for additional moving means for the gripping cycle. Advantageously said integrated positive pressure fluid flow gripper is coaxial to the axis of the wire 3, and is constituted such as to generate a whirling fluid flow, as known from a Vortex gripper or a Cyclone gripper.

FIGS. 7 and 8 show a part of the upper wire guiding head with an integrated positive pressure fluid flow gripper 60. The relevant part of the upper wire guiding head comprises: a central hole with the wire guide 9, a flushing nozzle with an inlet 61 by which the dielectric fluid is fed to an equalization chamber and to a tapered section with several straight fluid guide fins 63. Further it comprises a cyclone nozzle around said flushing nozzle, with an inlet 62 by which the fluid is fed to an annular chamber 64 and to an annular aperture 52 through a number of skew guide fins 53. The positive pressure fluid enters through inlet 62 and is distributed in the annular chamber 64, then passes through the skew guide fins 53. The fluid rotates at high speed and is thus subject to centrifugal forces, so that low pressure is generated in a central region between the upper wire guiding head 60 and the dropout piece. Conceptually the device works like the aforementioned Cyclone gripper.

The aforementioned integrated positive pressure fluid flow gripper 60 may also be used to generate a low pressure in the discharge gap during WEDM processing. This may be advantageous to support the flushing flow through the discharge gap to evacuate erosion debris when a suction mode is set at one of the wire guiding heads.

FIG. 8 shows another embodiment of such an integrated positive pressure fluid flow gripper 60. Only part of the upper wire guiding head is represented. The upper wire guiding head comprises a flushing nozzle with an inlet 61 for the flushing fluid which is distributed in an equalization chamber with a plurality of straight fluid guide fins 63, so as to produce a stable coaxial flushing flow through the subsequent tapered chamber. The flushing nozzle has at least one tangential inlet 62, under the straight fluid guide fins 63. When the positive pressure fluid is supplied through the tangential inlet 62 to the tapered chamber the fluid spins at high speed and generates a pressure gradient due to the centrifugal forces, with a low pressure region at the center of the flushing nozzle. In such a configuration, typically either the flushing nozzle with the inlet 61 or the nozzle with the tangential inlet(s) 62 is in operation.

The core piece 4 is attracted to the wire guiding head with an integrated positive pressure fluid flow gripper 60, and is removed by moving the machine axes: first the Z-axis to lift the core piece, and then the X/Y-axes to evacuate it and to drop it into a receptacle 12. The central flushing circuit is closed to reduce loss of pressure through the wire guiding section.

As said the wire guiding head may comprises one or more such integrated low pressure region generating fluid circuits, which however are operated like the aforementioned positive pressure fluid flow grippers. If a plurality of integrated grippers are provided, these grippers may be of same or different size, and may be activated independently or in any desired combination.

A device for the automatic handling of a dropout part according to the present invention, having a gripper which is supplied with fluid under positive pressure has a number of advantages over known systems. First, positive pressure is easier to be produced than negative pressure, and generally it is available in every machine shop. Secondly, since the direction of fluid flow is towards the machining area the supply circuit is not contaminated by machining particles produced in WEDM processing or any other dirt. In the contrary the use of a positive pressure provides a self-cleaning effect. In other words: less wear and less maintenance; the life expectancy and reliability is very high.

The device for the automatic handling of a core piece has been explained with particular reference to the evacuation of a dropout piece. It goes without saying that the same device can be used to manipulate a semi-finished or a finished punch. In this case the removed punch is placed in a safe dry receptacle.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS

1 WEDM respectively Wire Electric Discharge Machine
2 Work piece
3 Wire electrode
4 Core piece
5 Start hole; aperture
6 Upper wire guiding head
7 Lower wire guiding head
8 Support plate
9 Wire guide
10 Work table
11 Work tank
12 Receptacle
13 Drain
14 Chute
15 Collecting tray
16 Grid
17 Z-axis
18 Automatic handling device
19 Gripper support
20 Fluid inlet
21 Gripper body
22 Gripper base
25 Low pressure region
30 Bernoulli gripper
31 Deflector
32 Deflector holder 35 Diverging fluid flow
40 Vortex gripper
41 Vortex gripper core
42 Spacer
45 Swirling fluid flow
50 Cyclone gripper
51 Cyclone gripper core
52 Annular aperture
53 Skew guide fin
60 Upper wire guiding head with integrated gripper
61 Inlet for flushing
62 Inlet for lifting
63 Straight guide fin
64 Annular chamber
65 Fluid outlet
66 Incoming fluid flow
$X_G$ Evacuation movement
$Z_G$ Lifting movement

What is claimed is:

1. A wire electric discharge machine for machining a workpiece, comprising:
a handling device configured to handle core pieces produced by the wire electric discharge machine during the machining process of the workpiece; and
an upper wire guiding head and a lower wire guiding head that are moveable with respect to each other and with respect to the workpiece,
wherein the handling device comprises a gripper mounted in a fixed or movable relation to the upper wire guiding head, the gripper configured to be moved so as to face a produced core piece with a gripper base of the gripper,
wherein the gripper comprises a fluid inlet configured to permit a fluid flow under positive pressure to enter the gripper, and a fluid outlet at the gripper base configured to permit the fluid flow under positive pressure to exit the gripper,
wherein an interior of the gripper is configured to guide the fluid flow to produce a low pressure region at the gripper base as the fluid flow exits the gripper at the fluid outlet so as to generate a lifting force on the produced core piece to remove the produced core piece from the workpiece by movement of the gripper, and
wherein the handling device is mounted on a Z-axis of the wire electric discharge machine, the handling device comprising a piston configured to move the gripper between a retracted position and a gripping position.

2. The wire electric discharge machine of claim 1, wherein the fluid outlet is configured to route the fluid flow exiting the gripper in a radially diverging manner.

3. The wire electric discharge machine of claim 2, wherein the fluid outlet is configured to leave the fluid flow exiting the gripper flowing in a radial direction parallel to a surface of the gripper base once the gripper base is moved adjacent to a surface of the produced core piece.

4. The wire electric discharge machine of claim 1, wherein the low pressure region is generated by routing the fluid flow under positive pressure in the interior of the gripper.

5. The wire electric discharge machine of claim 4, wherein routing the fluid flow under positive pressure in the interior of the gripper so as to rotate it in a high speed whirling flow produces the low pressure region by centrifugal force.

6. The wire electric discharge machine of claim 1, wherein the low pressure region is generated by a combination of a high speed whirling flow and a high speed radially diverging fluid flow.

7. The wire electric discharge machine of claim 1, wherein the gripper comprises at least one spacer protruding from the gripper base, the at least one spacer being arranged in a predetermined position of the gripper base.

8. The wire electric discharge machine of claim 7, wherein the predetermined position is at a center of the gripper base, the at least one spacer having a surface configured to at least partially close apertures in adjacent core pieces.

9. The wire electric discharge machine of claim 1, wherein at least one gripper is integrated in the upper wire guiding head, and the fluid flow under positive pressure is supplied to the upper wire guiding head so as to generate the low pressure region at a base of the at least one gripper.

10. The wire electric discharge machine of claim 1, wherein the wire electric discharge machine includes a receptacle configured to receive removed core pieces.

11. The wire electric discharge machine of claim 10, wherein the receptacle is positioned adjacent to a sidewall or a rear wall inside a work tank of the wire electric discharge machine.

12. The wire electric discharge machine of claim 11, wherein the work tank has an opening to an exterior of the wire electric discharge machine in a region of said receptacle.

13. The wire electric discharge machine of claim 11, wherein the receptacle is provided in an external periphery of the work tank.

14. The wire electric discharge machine of claim 10, further comprising a chute connected with the receptacle, the chute being configured so that the removed core piece slides or falls by gravity through the chute to a collecting tray located in a periphery of the wire electric discharge machine.

15. The wire electric discharge machine of claim 14, wherein the collecting tray comprises a wire recovery box configured to collect used wire from the wire electric discharge machine.

16. The wire electric discharge machine of claim 1, wherein the fluid in the fluid flow under positive pressure is air, or a same fluid as is used in the wire electric discharge machining process, or a combination thereof.

17. The wire electric discharge machine of claim 16, wherein the same fluid as is used in the wire electric discharge machining process comprises deionized water.

18. A wire electric discharge machine for machining a workpiece, comprising:
a handling device configured to handle core pieces produced by the wire electric discharge machine during the machining process of the workpiece; and
an upper wire guiding head and a lower wire guiding head that are moveable with respect to each other and with respect to the workpiece; and
a chute connected with the receptacle, the chute being configured so that the removed core piece slides or falls by gravity through the chute to a collecting tray located in a periphery of the wire electric discharge machine,
wherein the handling device comprises a gripper mounted in a fixed or movable relation to the upper wire guiding head, the gripper configured to be moved so as to face a produced core piece with a gripper base of the gripper,
wherein the gripper comprises a fluid inlet configured to permit a fluid flow under positive pressure to enter the gripper, and a fluid outlet at the gripper base configured to permit the fluid flow under positive pressure to exit the gripper, wherein an interior of the gripper is configured to guide the fluid flow to produce a low pressure region at the gripper base as the fluid flow exits the gripper at the fluid outlet so as to generate a lifting force on the produced core piece to remove the produced core piece from the workpiece by movement of the gripper, and wherein the wire electric discharge machine includes a receptacle configured to receive removed core pieces.

19. The wire electric discharge machine of claim 18, wherein the collecting tray comprises a wire recovery box configured to collect used wire from the wire electric discharge machine.

* * * * *